United States Patent [19]
Thorndyke et al.

[11] Patent Number: 6,070,893
[45] Date of Patent: Jun. 6, 2000

[54] VEHICLE WHEEL RETENTION SYSTEM

[76] Inventors: Robert J. Thorndyke, 2 Rogers Rd Site M Box #4, R.R. #3 Brighton, Ontario, Canada, K0K 1H0; Wendell E. Thorndyke, 18 Strathallan Blvd., Courtice, Ontario, Canada, L1J 5K4

[21] Appl. No.: 09/023,411

[22] Filed: Feb. 13, 1998

[51] Int. Cl.[7] .......................... B60R 19/00; B62D 25/16
[52] U.S. Cl. ............................................ 280/160; 280/768
[58] Field of Search .................................. 280/160, 847, 280/848, 849, 851, 770; 180/271; 296/198; 293/126, 15, 17, 117, 128; 70/225

[56] References Cited

U.S. PATENT DOCUMENTS

| | | |
|---|---|---|
| 1,347,937 | 7/1920 | Clary . |
| 1,472,005 | 10/1923 | Jones ........................................ 280/848 |
| 1,738,458 | 12/1929 | Sorce ......................................... 293/30 |
| 1,771,206 | 7/1930 | Cohen . |
| 2,000,260 | 5/1935 | Snyder ..................................... 280/160 |
| 2,605,119 | 7/1952 | Earnest ..................................... 280/849 |
| 2,647,763 | 8/1953 | Hudson . |
| 2,935,336 | 5/1960 | Case ........................................ 280/851 |
| 3,110,515 | 11/1963 | Loftin . |
| 4,319,764 | 3/1982 | Whitaker ................................. 280/154 |
| 4,437,697 | 3/1984 | Hinojos .................................... 293/118 |
| 5,735,560 | 4/1998 | Bowen et al. ............................. 293/15 |
| 5,823,586 | 10/1998 | Marley ..................................... 293/126 |
| 5,924,513 | 7/1999 | Jones ........................................ 180/271 |
| 5,924,735 | 7/1999 | Meyer, Jr. ................................ 280/851 |
| 5,954,151 | 9/1999 | Cochrane et al. ....................... 180/271 |
| 5,961,137 | 10/1999 | Knight ..................................... 280/160 |
| 5,967,554 | 10/1999 | Rea ......................................... 280/751 |
| 5,975,572 | 11/1999 | Benoit ..................................... 280/768 |

Primary Examiner—Brian L. Johnson
Assistant Examiner—Michael Britton
Attorney, Agent, or Firm—Richard C. Litman

[57] ABSTRACT

A wheel retention system for use on the chassis of a large motor vehicle such as a tractor-trailer. Three support members are removably secured to the chassis and the support members support a retaining member positioned proximate to and parallel with the outer sidewalls of the wheels of the vehicle, forming a perimeter around the wheels. A pair of cylindrical sleeves axially and rotatably mounted upon the retaining member, the sleeves being positioned to confront a rotating wheel upon dislodging of the wheel from the chassis. The pair of support members comprise square tubing and completely pass from one side of the chassis to the other side of the chassis. The middle portion of each support member comprises an axle-retaining portion to trap an axle of the vehicle, should the axle disengage from the chassis. Each support member has a bore in its opposite end to accommodate a retaining member on either side of the vehicle such that the retaining member is positioned proximate to and parallel with the outer sidewalls of the wheels of the vehicle, forming a perimeter around the wheels.

10 Claims, 4 Drawing Sheets

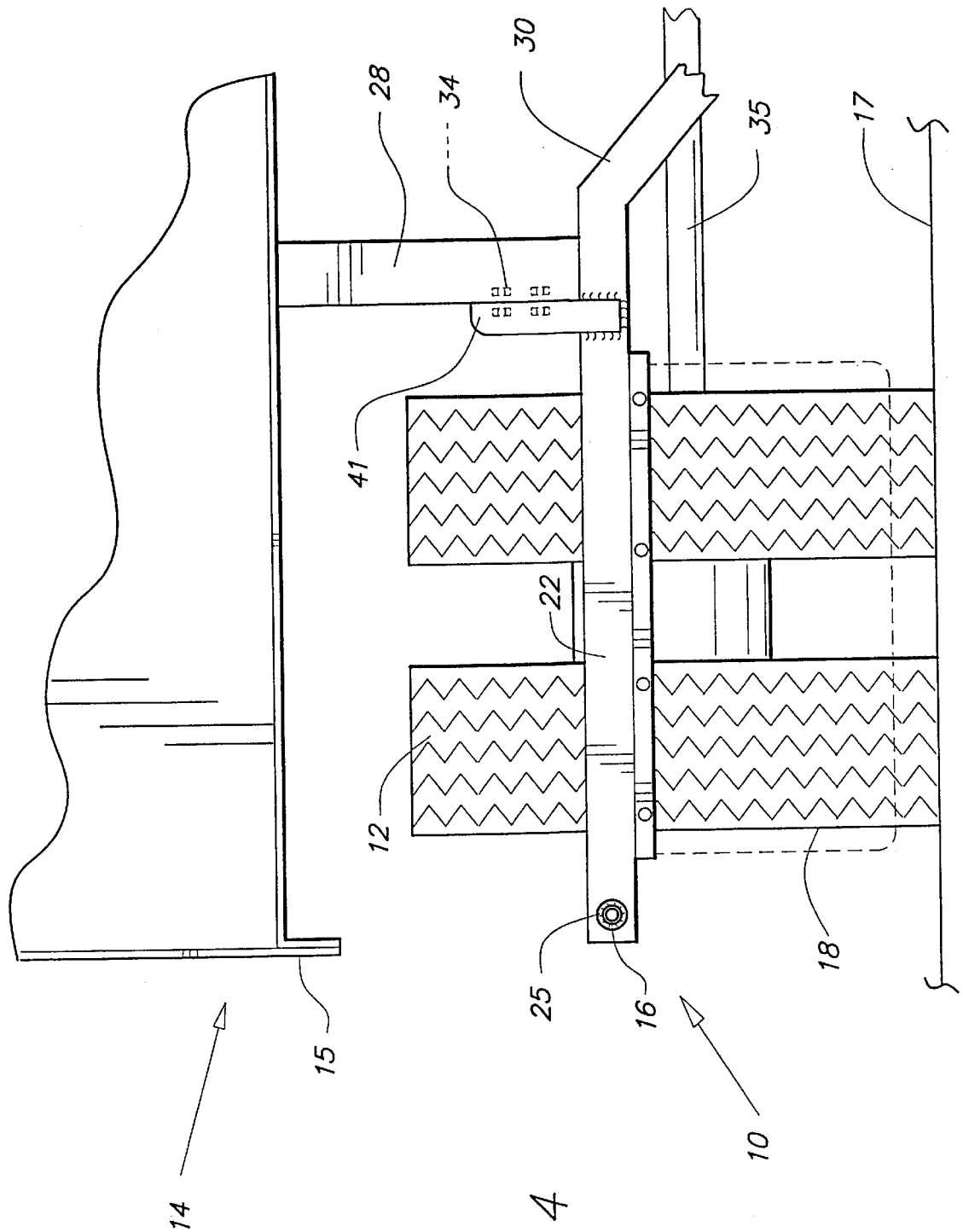

VEHICLE WHEEL RETENTION SYSTEM

BACKGROUND OF THE INVENTION

1. Field of the Invention

The present invention relates to devices designed to safely retain vehicle wheels and/or axles in proximity to the vehicle should a wheel disengage from the vehicle while the vehicle is in motion.

2. Description of the Related Art

With the growth of interstate commerce, semi tractor-trailers, or "eighteen wheelers" have become indispensable for moving goods across the continent. These large trucks are responsible for transporting the vast majority of such goods. Unfortunately, motorists must share the same roads with these huge vehicles. These vehicles often travel hundreds of thousands miles per year and therefore are subject to a greater frequency of mechanical failure or other mishaps. It is therefore not uncommon for the lug nuts that hold the wheel to the axle of a semi tractor-trailer to break off or become loose, sending the huge tire hurtling down the road at unsuspecting motorists. Accidents caused by runaway vehicle wheels occur all too frequently on our roads, resulting in millions of dollars in lost property and often the loss of life.

Devices that either cover or protect vehicle wheels are known in the prior art. One such device is described in U.S. Pat. No. 1,347,937, which issued to Clary on Jul. 27, 1920. This device discloses a vehicle guard consisting of a bar which mounts across the wheel-well of a vehicle between the bumper and the running board to protect the wheels of the vehicle in the event of a collision.

Although not described in written materials, it is common practice to provide beverage delivery vehicles with steel bars extending along their rear wheel-wells. These bars are affixed to the fenders and function as a step which allows the delivery person to reach the beverages located near the roof of the vehicle. However, given the weak mounting position of these bars, it is unlikely that they are able to retain a dislodged truck wheel.

U.S. Pat. No. 3,110,515 issued to Loftin on Nov. 12, 1963 discloses a vehicle body fender structure with horizontally protruding reinforcing sections that provide added support to the body of a vehicle in the event of a collision. The fenders partially cover both the front and rear wheels of the vehicle so that the wheels are protected in the event of an accident. It is common practice in the automobile industry to provide vehicles with rear wheel-well covers that extend downward to partially cover the rear wheels. However, these covers have either a cosmetic or an aerodynamic function, and are not strong enough to retain a dislodged vehicle wheel.

U.S. Pat. No. 1,771,206, which issued to Cohen on Jul. 22, 1930, discloses a motor vehicle trailer assembly with torque members connecting the axles of the trailer for added rigidity. This trailer does not provide for a means of retaining a wheel, should the wheel become dislodged from the axles of the trailer.

U.S. Pat. No. 2,605,119, which issued Earnest on Jul. 29, 1952, discloses a splash guard for vehicles consisting of a framework that attaches to the body of a vehicle. Panels are fitted to the framework to reduce the splashing of water by the vehicle. The side panels of the splash guard are hinged to the framework, allowing access to the tires, but compromising the structural rigidity of the device. Thus, the splash guard is unlikely to adequately retain a runaway vehicle wheel.

U.S. Pat. No. 2,647,763, which issued to A. Hudson on Jan. 20, 1951, discloses a vehicle wheel and anti-theft device that covers the hubcaps of a wheel, thereby preventing access to the lug nuts and thwarting the potential thief. However, this invention only marginally covers the side of the wheel and provides no protection in front of or behind the wheel. Therefore, in the event the wheel becomes detached, the anti-theft device may not prevent the wheel from breaking loose from the axle of the vehicle.

None of the above inventions and patents, taken either singularly or in combination, is seen to describe the instant invention as claimed. Thus, a vehicle wheel retention system solving the aforementioned problems is desired.

SUMMARY OF THE INVENTION

The present invention provides a wheel retention system for use on the chassis of a large motor vehicle such as a tractor-trailer. Two support members are removably secured to the chassis by bolts and mounting brackets. The support members support a retaining member positioned proximate to and parallel with the outer sidewalls of the wheels of the vehicle, forming a perimeter around the wheels. Also provided are cylindrical sleeves axially and rotatably mounted upon the retaining member, the sleeves being positioned to confront a rotating wheel upon dislodging of the wheel from the chassis. A bushing mounted inside each sleeve allows for journaled rotation of the sleeves.

The pair of support members comprise square tubing. A third support member is present between the two sets of wheels, and all three support members completely pass from one side of the chassis to the other side of the chassis. Each support member has a bore in each end to accommodate a retaining member on either side of the vehicle. Additionally, each support member has an axle-retaining portion designed to retain the axle should the axle become disengaged from the chassis.

Accordingly, it is a principal object of the invention to provide a wheel retention system that may safely maintain the wheels in proximity to the chassis of a vehicle should a wheel disengage from the axle of the vehicle while in motion.

It is another object of the invention to provide a wheel retention system that may safely maintain a vehicle axle in proximity to the chassis of a vehicle should the axle disengage from the chassis of the vehicle while in motion.

It is a further object of the invention to provide a system for wheel retention that may be easily installed and removed from a vehicle.

It is an object of the invention to provide improved elements and arrangements thereof in a vehicle wheel retention system for the purposes described which is safe, inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a rear end view of the present invention mounted on a truck chassis.

Similar reference characters denote corresponding features consistently throughout the attached drawings.

DETAILED DESCRIPTION OF THE PREFERRED EMBODIMENTS

Figure 1:
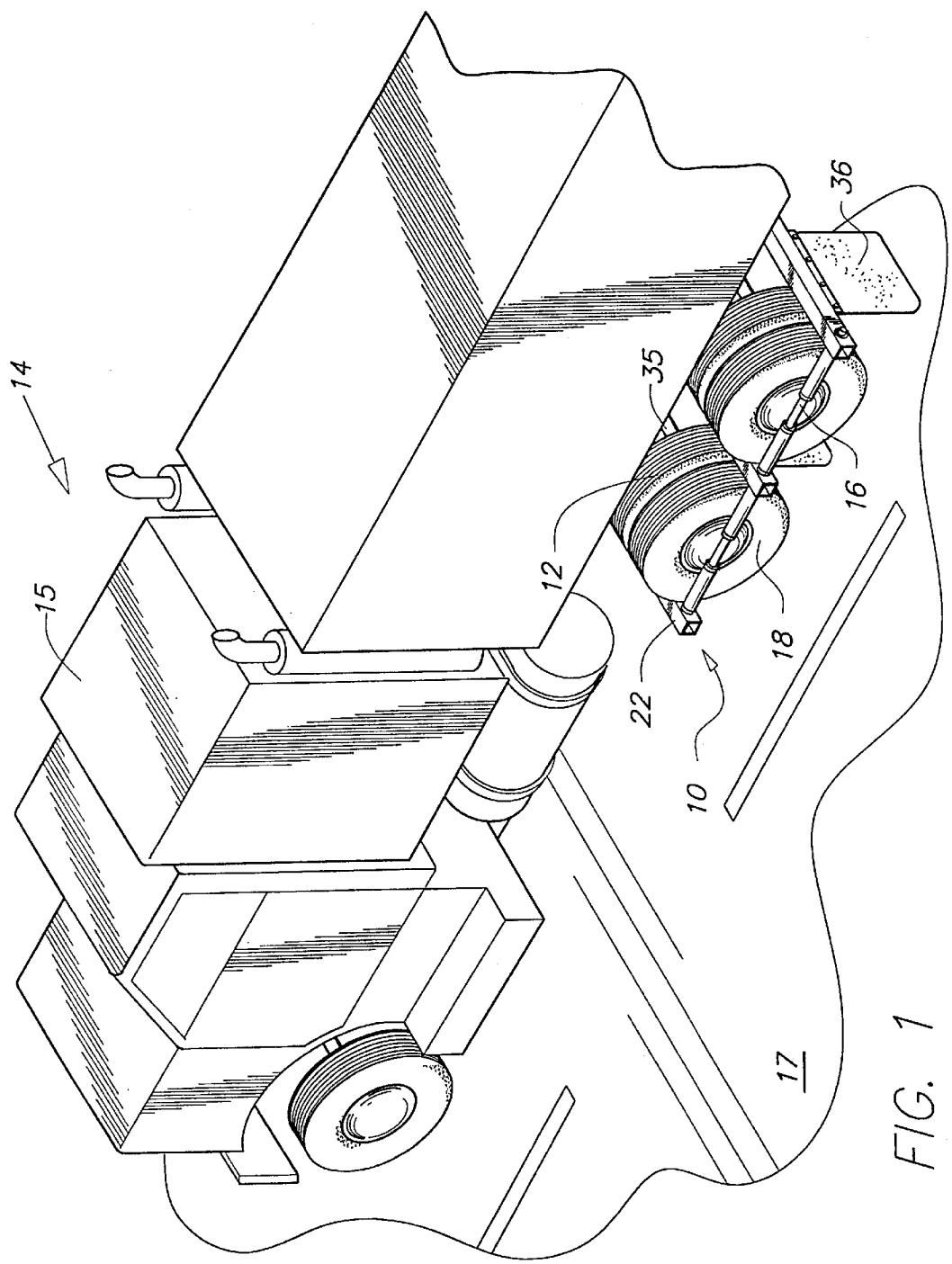
FIG. 1 is an environmental, perspective view of a vehicle wheel retention system in use according to the preferred embodiment of the present invention, as it is used on a truck.

Referring now to the drawings wherein like numerals represent like elements, FIG. 1 shows a vehicle wheel retention system 10 according to the preferred embodiment of the present invention, which is shown in use with wheels 12 of a truck 14 having two sets of wheels. The system 10 is particularly disposed for use with two or more sets of wheels located on opposite sides of the truck 14. The truck 14 shown is a conventional tractor-trailer of the type having a body 15 supported upon a chassis 28 and one or more sets of wheels 12 rotatably supported beneath the chassis for propelling the vehicle over a surface such as a road 17. Each set of wheels 12 is supported beneath the chassis on an axle 35 so that outer sidewalls 18 of the wheels do not extend beyond the edge of the body 15.

Figure 2:
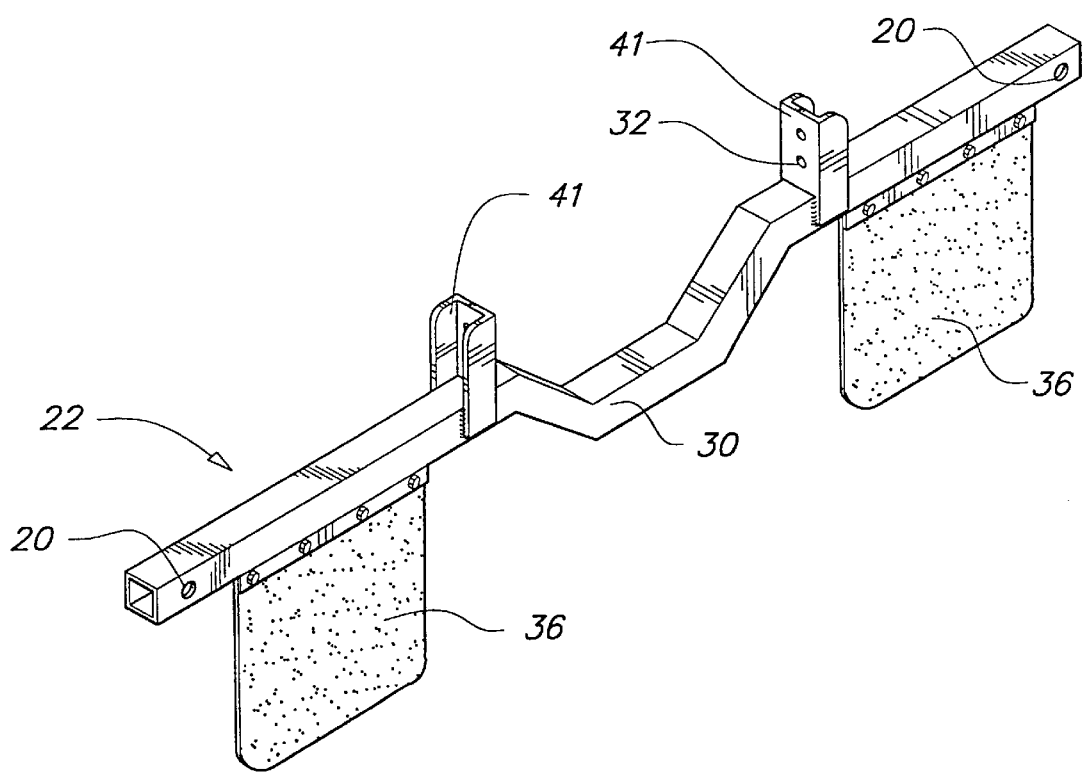
FIG. 2 is a perspective view of a support member of the present invention.
Figure 3:
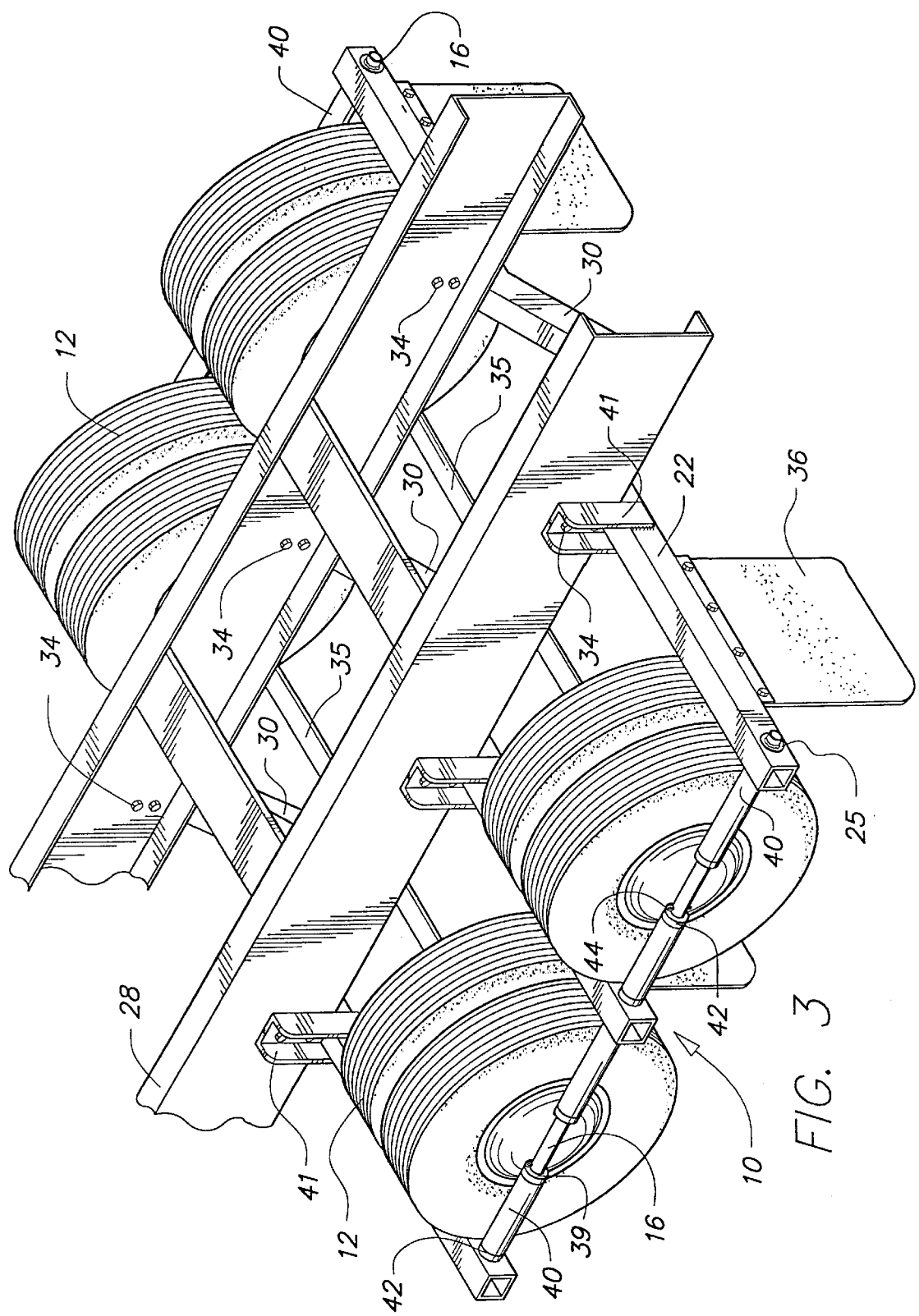
FIG. 3 is a perspective view of the present invention mounted on a truck chassis.

Referring now to FIGS. 1, 2 and 3, system 10 generally comprises three support members 22 and a pair of retaining members 16. Each support member 22 is a three-inch by two-inch square beam that is disposed to be secured to the chassis 28 by a pair of mounting brackets 41 welded to each support member. Each support member 22 completely passes under the chassis 28 in order to support one retaining member 16 on one side of the chassis and another retaining member 16 on the opposite side of the chassis.

Additionally, an axle-retaining portion 30 is present in the middle of each support member 22, in order to trap a vehicle axle 35 between the support member and the road 17 and in front of the support member, should an axle disengage from the chassis 28. In the preferred embodiment, the axle-retaining portion 30 is in a truncated "V" configuration, yet it will be readily appreciable by those skilled in the art that the axle-retaining portion may be otherwise configured in alternative embodiments.

Additionally, each support member 22 may have a mudflap 36 positioned proximate to each end of the support member to prevent airborne debris, from damaging other vehicles proximate to the truck 14. The support member 22 is ideally positioned to rigidly maintain each mudflap sufficiently low to the road 17 to block substantially all such airborne debris.

Each support member 22 is fixedly secured to a pair of mounting brackets 41 located on opposite sides of the axle-retaining portion 30. The mounting brackets 41 are in turn connected to the chassis 28 by a plurality of nut and bolt connectors 34 or other like connectors. The chassis 28 and the pair of mounting brackets 41 both have apertures 32 passing therethrough which are disposed to receive nut and bolt connectors 34. Additionally, the mounting bracket 41 maintains the support members 22 and retaining members 16 coplanar to the axles 35 of the truck 14.

Both ends of each support member are provided with support bores 20 passing therethrough in a generally perpendicular relationship to the length of the support member 22. The support members are of sufficient length to completely pass under the chassis and extend the support bores 20 thereon beyond the outer sidewalls 18 of the wheels 12 without extending substantially beyond the opposing edges of the tractor-trailer body 15. The support bores 20 of each support member 22 should extend the same distance beyond the outer sidewalls 18 of the wheels 12 to ensure that each retaining member 16 remains substantially parallel to the wheel. Each retaining member 16 preferably should remain approximately three-quarter inches away from the outer sidewall 18 of the wheel 12. The support members 22 are spaced along the chassis 28 to provide about one inch of clearance between each support member and the tire tread of the wheel 12 closest thereto.

Each support bore 20 is configured to receive an end of a retaining member 16, whereby one support bore 20 of each support member 22 receives an end of one retaining member 16, and the other support bore of the same support member receives an end of the other retaining member. The retaining members 16 span between the outer support members 22, with opposite ends of each retaining member extending through its respective support bore 20 and projecting slightly beyond the support bore.

To prevent displacement of the retaining member 16 ends from the support bores 20, an integral enlargement 25 is provided at one end of each retaining member to prevent displacement in one direction. At the other end of each retaining member 16 a removable connector is provided. Although not shown, each retaining member 16 may alternatively possess removable connectors at both ends of each retaining member. The removable connectors are preferably cotter pins (not shown). To receive the cotter pin, an end of each retaining member 16 is provided with a diametrical passageway (not shown) that extends through each retaining member.

Rotatably mounted on the retaining member 16 is a plurality of cylindrical sleeves 40. For each wheel the retaining member 16 spans, a pair of cylindrical sleeves 40 is mounted thereon. Each cylindrical sleeve 40 is journaled for rotation by at least one bushing 42, and more preferably a pair of bushings 42 at each end of each sleeve. The bushings 42 are of a conventional configuration and design, and they may be press-fit or otherwise secured to each end of the sleeve 40. The bushings 42 allow each cylindrical sleeve 40 to rotate freely about the retaining member 16, which is cylindrical in configuration. The outer surface of each sleeve 40 is ideally positioned approximately three-quarter inches away from the outer sidewall 18 of the wheel 12.

The cylindrical sleeves 40 are axially slidable along the length of the retaining member 16, as discussed hereinafter. To prevent axial displacement of each cylindrical sleeve 40 during operation of the tractor-trailer 14, a pair of cotter or spring pins 44 are provided to stabilize each cylindrical sleeve. To assist in rotation of the cylindrical sleeves 40 during operation of the wheel retention system 10, a rotational washer 39 is positioned intermediate to each cylindrical sleeve and each cotter or spring pin 44.

The retaining member 16 includes a plurality of appropriately spaced diametrical passageways (not shown) that extend through the retaining member. The cotter or spring pins 44 are of a conventional design and configuration, and preferably they are of a heavy-duty construction which will resist fatigue and corrosion. The cylindrical sleeves 40 are appropriately spaced such that upon the dislodging of a wheel 12, one cylindrical sleeve contacts one portion of the outer sidewall and the other cylindrical sleeve contacts the diametrically opposite portion of the outer sidewall, as discussed more fully hereinafter.

To install the wheel retention system 10, the mounting brackets 41 of each support member 22 are affixed to the chassis 28 of the truck 14 with nut and bolt connectors 34, one mounting bracket affixed to one side of the chassis, and the other mounting bracket affixed to the other side of the chassis.

One end of each retaining member 16 is then inserted through the support bore 20 of each outer support member 22. One pair of cylindrical sleeves 40 and rotation washers 39 are placed upon each retaining member 16 prior to insertion through the middle support member 22. Once each retaining member 16 is inserted through the support bore 20 of the middle support member 22, the second pair of cylindrical sleeves 40 and rotation washers 39 are placed upon each retaining member. Each retaining member is then inserted through the remaining support bore 20 until the integral enlargement 25 on the other end of each retaining member prevents further displacement of the retaining members. The cylindrical sleeves 40 and rotation washers 39 are secured in position by cotter pins 44 inserted through a plurality of appropriately spaced diametrical passageways (not shown) that extend through the retaining member 16. Finally, the retaining member is secured in position by a cotter pin (not shown).

In the event that a wheel 12 is dislodged from a truck axle 35, the wheel is safely retained within the perimeter created around the wheel by the chassis 28, the two support members 22, and the retaining member 16. Additionally, upon dislodging of the wheel 12 from the axle 35, one portion of the sidewall 18 of the wheel 12 comes into contact with one cylindrical sleeve 40, causing that sleeve to rotate in one direction, and the opposite portion of the sidewall comes into contact with another cylindrical sleeve, causing it to rotate in the opposite direction. Smoke-producing friction is created from this contact, thereby alerting the truck driver of the dislodged wheel and reducing the risk of further damage. In the event an axle 35 disengages from the chassis 28, the axle-retaining portion 30 of the support member 22 serves to trap the axle between the support member and the road 17, in order to prevent the axle and wheels attached thereto from escaping from the vehicle, thereby reducing the risk of further damage.

It should be apparent to one skilled in the art that although the preferred embodiment has been described with three support members 22 for each retaining member 16, a sufficiently rigid connection would allow for two support members or even a single support member for each retaining member 16 or both retaining members 16. With the use of only a single support member 22 it would be desirable to utilize a retaining member 16 having a first portion which is disposed to be positioned in parallel relation to the outer sidewalls 18 of the wheels 12, and a second portion which is angled with respect to the first portion for enclosing the set of wheels within the structural framework of the system 10 as it is mounted to the chassis. Thus, the second portion of the retaining member 16 would fill the space vacated by removal of a support member 22. It should also be apparent that reflective tape (not shown) may be placed along the retaining members 16 to alert drivers of other vehicles at nighttime.

It is to be understood that the present invention is not limited to the embodiments described above, but encompasses any and all embodiments within the scope of the following claims.

We claim:

1. A wheel retention system for use on a vehicle of the type having a chassis with opposing sides, a body supported on the chassis, and one or more sets of wheels propelling the vehicle over a road surface, and having outer sidewalls and being rotatably supported beneath the chassis on one or more axles such that the outer sidewalls of the wheels extend not beyond the edge of the body, the wheel retention system comprising:

at least a first and a second support member secured to the chassis, said second support member parallel to said first support member, each said support member passing from one of the opposing sides of the chassis to the other and having opposed ends and a middle portion, each of said ends extending a predetermined distance away from each side of the chassis toward the edge of the body without extending substantially beyond the edge of the body, said middle portion being dimensioned and configured to retain a free axle which has become disengaged from the chassis;

a first and a second retaining member, each said retaining member connected to each said end of each said support member, each said retaining member being positioned in operative relation to the outer sidewalls of the wheels without extending substantially beyond the edge of the body.

2. The vehicle wheel retention system as defined in claim 1 wherein said middle portion of said support member has a truncated V-shaped configuration.

3. The vehicle wheel retention system as defined in claim 1 wherein each said support member is removably secured to the chassis, the wheel retention system further comprising securing means for removably securing each said support member to the chassis.

4. The vehicle wheel retention system as defined in claim 3 wherein, said securing means comprises:

a mounting bracket having a plurality of apertures formed therethrough, said plurality of apertures for aligning with apertures of the chassis, said mounting bracket fixedly mounted to each said support member; and a first plurality of connectors, each of said first plurality of connectors passing through one of said plurality of apertures of said mounting bracket to secure said mounting bracket to each said support member and the chassis.

5. The vehicle wheel retention system as defined in claim 2 further comprising a second retaining member connected to said second end of said first support member, said second retaining member being positioned in operative relation to the outer sidewalls of the wheels without extending substantially beyond the edge of the body.

6. The vehicle wheel retention system as defined in claim 5 wherein said first retaining member and said second retaining member are positioned coplanar to the axles of the vehicle.

7. The vehicle wheel retention system as defined in claim 1 wherein the vehicle has two sets of wheels, each set having a wheel positioned on opposite sides of the vehicle, the vehicle wheel retention system further comprising:

a third support member parallel to said first and second support members, said third support member secured to the chassis and having opposed ends and a middle portion, each of the ends of said third support member extending a predetermined distance away from each side of the chassis toward the edge of the body without extending substantially beyond the edge of the body, said middle portion being dimensioned and configured to tray a free axle which has become disengaged from the chassis;

one of said ends of said third support member passing between the two sets of wheels and being connected to said first retaining member intermediate said first support member and said second support member; and the other of said ends of said third support member passing between the two sets of wheels and being connected to said second retaining member intermediate to said first support member and said second support member.

8. The vehicle wheel retention system as defined in claim 7 wherein said first support member, said second support member, said third support member are formed of square tubing.

9. The vehicle wheel retention system as defined in claim 7 wherein each said first retaining member and said second retaining member is removably connected to said first support member and said second support member, the wheel retention system further comprising:

first connecting means for removably connecting said first retaining member to said first support member;

second connecting means for removably connecting said first retaining member to said second support member;

third connecting means for removably connecting said second retaining member to said first support member; and fourth connecting means for removably connecting said second retaining member to said second support member.

10. The vehicle wheel retention system as defined in claim 1 wherein:

each said first and second retaining members includes:
    a first cylindrical sleeve positioned to confront a wheel upon dislodging of said wheel from the chassis; and
    a second cylindrical sleeve positioned to confront said wheel upon dislodging of said wheel from the chassis;
each said cylindrical sleeve is rotatably mounted upon its respective retaining member.

\* \* \* \* \*